(12) United States Patent  
Ghosh et al.

(10) Patent No.: US 9,090,478 B2  
(45) Date of Patent: Jul. 28, 2015

(54) PRODUCTION OF HIGH PURITY SALT WITH REDUCED LEVELS OF IMPURITIES

(71) Applicant: Council of Scientific & Industrial Research, New Delhi (IN)

(72) Inventors: Pushpito Kumar Ghosh, Gujarat (IN); Sumesh Chandra Upadhyay, Gujarat (IN); Vadakke Puthoor Mohandas, Gujarat (IN); Rahul Jasvantrai Sanghavi, Gujarat (IN); Babulal Rebary, Gujarat (IN)

(73) Assignee: Council of Scientific & Industrial Research, New Delhi (IN)

(*) Notice: Subject to any disclaimer, the term of this patent is extended or adjusted under 35 U.S.C. 154(b) by 0 days.

(21) Appl. No.: 14/389,418

(22) PCT Filed: Apr. 2, 2013

(86) PCT No.: PCT/IN2013/000217  
§ 371 (c)(1),  
(2) Date: Sep. 30, 2014

(87) PCT Pub. No.: WO2013/150546  
PCT Pub. Date: Oct. 10, 2013

(65) Prior Publication Data  
US 2015/0059129 A1   Mar. 5, 2015

(30) Foreign Application Priority Data  
Apr. 2, 2012 (IN) .......................... 0597/DEL/2012

(51) Int. Cl.  
*C01D 3/06* (2006.01)  
*C01D 3/04* (2006.01)  
*C01D 3/14* (2006.01)

(52) U.S. Cl.  
CPC .. *C01D 3/06* (2013.01); *C01D 3/04* (2013.01); *C01D 3/14* (2013.01); *C01P 2006/80* (2013.01)

(58) Field of Classification Search  
CPC ............... C01D 3/06; C01D 5/00; B01D 9/00  
USPC .............................................. 23/295 S, 295 R  
See application file for complete search history.

(56) References Cited

U.S. PATENT DOCUMENTS

| | | | |
|---|---|---|---|
| 2,876,182 | A | 3/1959 | Hopper et al. |
| 5,300,123 | A | 4/1994 | Grott |
| 5,447,543 | A | 9/1995 | Sadan |
| 2003/0012726 | A1 | 1/2003 | Oh et al. |

FOREIGN PATENT DOCUMENTS

| GB | 764 013 A | 12/1956 |
|---|---|---|
| WO | 2007/110733 A1 | 10/2007 |

OTHER PUBLICATIONS

International Search Report and Written Opinion for PC Application No. PCT/IN2013/000217, dated Aug. 1, 2013, 12 pages.  
Second Written Opinion for PCT Application No. PCT/IN2013/000217, mailing date Apr. 1, 2014, 6 pages.

*Primary Examiner* — Edward Johnson  
(74) *Attorney, Agent, or Firm* — Westman, Champlin & Koehler, P.A.

(57) ABSTRACT

The invention discloses an improvement over the existing process of producing solar salt of high purity from seawater and minimizes the need for downstream purification. More particularly, the invention teaches the practical utility of recrystallization of salt in solar salt pans using seawater itself as the dissolving medium. The resultant recrystallized salt is obtained with a yield up to 80% and with much reduced levels of impurities. Special mention is made of the bromide level which is reduced 7-10 fold. The invention is most ideal for trace impurities which reside in the salt crystal lattice and are difficult to dislodge by conventional methods adopted for salt purification and where conventional recrystallization would be cost ineffective and scalability would pose a problem. The invention can be practiced by solar salt works based on seawater and where spare land is available to set up additional crystallizers required for the purpose of recrystallization.

9 Claims, 2 Drawing Sheets

PRODUCTION OF HIGH PURITY SALT WITH REDUCED LEVELS OF IMPURITIES

CROSS-REFERENCE TO RELATED APPLICATION

This Application is a Section 371 National Stage Application of International Application No. PCT/IN2013/000217, filed 2 Apr. 2013 and published as WO 2013/150546 A1 on 10 Oct. 2013, in English, the contents of which are hereby incorporated by reference in their entirety.

The following specification particularly describes the nature of the invention and the manner in which it is to be performed.

FIELD OF THE INVENTION

The present invention relates to a process for the preparation of high purity solar salt from sea and sub-soil brines with highly reduced levels of impurities. More specifically the invention relates to a cost-effective process for preparation of common salt of a specification wherein the trace element impurities like bromine, iodine etc. are highly detrimental for its industrial applications as in the case of specialty inorganic chemicals. The process relates to preparation of the above solar salt through an improved process wherein the harvested salt containing the above impurities is reprocessed to obtain high purity solar salt with all the detrimental impurities well within the prescribed limits.

BACKGROUND OF INVENTION

The world salt production has crossed 240 million ton per annum and more than 60% of the total salt produced is used for industrial applications, chlor-alkali and specialty chemical industries being the major consumers.

The salt produced from brine by solar evaporation is found to contain substantial impurities like calcium, magnesium, sulphate, bromide, iodide and other trace element impurities. The presence of such impurities may necessitate further purification of the harvested salt to make it suitable for its specific end use. Superior quality industrial grade salt with specified limits of calcium, magnesium, sulphate, bromide, iodide and other trace element is preferred by these industries as the use of such salt reduces the brine purification cost and effluent generation.

Solar salt is produced from seawater; sub-soil brine, lake brine and solution mining of rock salt. The salt rocks are, in fact, of marine origin. All these sources constitute a multi-component salt system with a number of ions in the dissolved state and it is reported that sea water is a store house of chemicals with more than 73 elements present in dissolved state. Hence direct recovery of any of these salts in its pure form from these sources poses a great problem. Salt produced from the above brines through the well known process of fractional crystallization by solar evaporation is invariably contaminated with impurities such as calcium, magnesium, sulphate, bromide, iodide and other trace elements. All these impurities are detrimental for industries where salt is used as a basic raw material. On the other hand, solar salt production from natural brines is most cost-effective and viable alternative. It is, therefore, important to devise means of making solar salt with minimum impurities while retaining the advantage of cost-effectiveness.

Impurities such as Ca and Mg can critically affect the membrane in chlor-alkali plants and their concentration has to be reduced to ppb levels in the brine employed. It is of utmost importance to minimise such impurities to the maximum extent possible so that the cost of the downstream purification and associated waste formation can be minimised.

Similarly, high levels of halide impurities such as bromide and iodide in salt can be damaging for certain industrial applications. For example, high levels of iodide, can adversely affect the membrane employed in chlor-alkali process whereas high level of bromide can lead to formation of chloro bromo methane during chloroform production.

Although NaCl can be purified to any extent desired, there is an associated cost which would increase the cost of the raw material. Thus it is of great importance to bring about purification in the most practical manner feasible, which is the object of the present invention.

Reference may be made to the paper entitled "Industrial Minerals, April 1996" by V. M. Sedivy, wherein the critical importance of salt purity and the deleterious effects of contaminants on various industries are described.

Reference may be made to the paper entitled *"Primary Brine Treatment Operations"* by D. Elliott presented at the 1999 Eltech Chlorine/Chlorate Seminar on Technology Bridge to the New Millenium, Ohio, 13 Sep. 1999, wherein the critical importance of salt purity and the deleterious effects of various contaminants including heavy metals on chlor-alkali manufacture are highlighted.

Reference may be made to U.S. Pat. No. 7,037,481 dated May 2, 2006, wherein, Becenel, Jr. reports the methods and installations for producing ultra pure sodium chloride salt crystals primarily for use in saturating depleted brine resulting from the electrolytic decomposition of saturated brine in chlor alkali membrane cells for the production of chlorine, caustic soda and hydrogen. This invention particularly relates to the production of ultra pure sodium chloride salt crystals by processing primary treated brine by first acidifying the primary treated brine, then stripping the carbonic acid produced by acidification as carbon dioxide, and then returning the brine to a pH of about 6 or higher which is sufficient for processing it in evaporation equipment where the ultra pure salt crystals are produced. The process described above not only involves various unit operations but it is a costly proposition with respect to energy involvement.

Reference may be made to GB764013A, dated 19 Dec., 1956 entitled "Improved Method of Preparing Sodium Chloride Brines of High Purity" by Albright and Wilson have claimed that sodium chloride brines low in calcium sulphate content are prepared by dissolving solid sodium chloride contaminated with calcium sulphate in water in presence of a polyphosphate soluble in brine in the concentration range of 50-100 ppm. It is claimed that the amount of calcium sulphate is further decreased by dissolving solid sodium chloride in the presence of both the poly phosphate and water-soluble alkaline earth metal compound such as calcium chloride or acetate or barium chloride up to 1% level. The drawbacks of this process are that it is less appropriate for solar salt production and more appropriate as a means of post-treatment of brine obtained by dissolving salt.

Reference may be made to U.S. Pat. No. 3,360,343 dated 26 Dec., 1967 Grant A. Mickelson, Cary et. al. describes a process for the production of high purity salt with highly reduced levels of Ca and Mg, the said process consisting of preparing a saturated solution of NaCl contaminated with Ca and Mg, evaporating the solution to recover salt with reduced levels of Ca and Mg, treating the salt so produced with dilute mineral acids to form a slurry and recovering un-dissolved purified salt with reduced levels of Ca and Mg from the said slurry. The main objective of the said patented process is to reduce the levels of Ca and Mg in solar salt and there is no mention about the removal of trace elements from salt. Moreover, the process involves multi phase steps like recovering solar salt, purifying the salt to lower down the Mg and Ca impurities, crushing the salt to specific micron level, treating with mineral acid and recovering salt from the slurry. All these steps make the process highly uneconomical.

Reference may be made to EP 1545733B1 (WO 2004/018068) dated Jan. 3, 2007 by Akzo Nobel N.V., wherein an evaporative salt crystallization process that produces pure salt is disclosed. The process utilizes saccharide or its derivative in an evaporative process occurring at room temperature. The main disadvantage of the said process is that the saccharide is used in about 5% (w/v) concentration which would increase the viscosity of the brine and slow down evaporation and also add significantly to cost. Moreover, the use of saccharide will also increase the organic carbon content which is not acceptable for chlor-alkali and specialty inorganic chemical industries.

Reference may be made to U.S. Pat. No. 4,026,676 dated 31 May, 1977 entitled "Process for producing salt having a reduced calcium sulfate content" by H. W. Fiedelman a process for the preparation of the cubic crystalline form of sodium chloride is described using either (1) a feed and bleed procedure comprising admixing an alkali metal phosphate with an aqueous solution of salt to increase the super saturation of calcium sulphate there in and evaporating the brine at an elevated temperature and reduced pressure to cause crystallization of pure salt and concomitantly bleeding brine from the chamber to the feed brine such as to maintain the calcium sulphate in the dissolved state and prevent its precipitation with salt or (2) subjecting the brine to solar evaporation to concentrate the same to the salt point, i.e. that point at which the salt will crystallize from the brine, adding an alkali metal polyphosphate to brine at this point to increase the super saturation of calcium sulphate there in and processing the brine for salt production following the conventional method. The process involves addition of costly chemicals at a very high dosage level and will prove to be highly uneconomical.

Reference may be made to U.S. Pat. No. 6,812,011 dated 2 Nov., 2004 entitled "Process for the Removal of calcium ions from the Brine by Marine Cyanobacteria" by CSIR claimed that common salt with reduced Ca impurity can be produced from sea/subsoil brine by mopping up Ca in the brine through certain types of calcium loving marine cyanobacteria. The drawback of this process is that it describes the method of reduction of Ca impurities and does not describe the reduction of remaining impurities such as magnesium, sulphate and trace elements.

Reference may be made to U.S. Pat. No. 7,037,481 dated 2 May, 2006 by United Brine Services Company describes a process for the production of ultra pure sodium chloride salt crystals primarily for use in saturating depleted brine resulting from the electrolytic decomposition of saturated brine of chlor-alkali membrane cells. This invention specifically relates to the production of ultra pure sodium chloride salt crystals by processing primary treated brine through its acidification and processing the acidified brine in evaporation equipment where ultra pure salt crystals are produced. Apart from involving complicated steps, the process is cumbersome and energy intensive. Moreover, the main objective of the above patented process is different from the objectives of the present innovation that is reduction of trace element impurities carried along with solar salt.

Reference may be made to research article: "*Rain Washing of Common Salt Heaps*" by M. P. Bhatt et al. (Salt Research and Industry 10 (2), 1974, p 13) it is reported that sea salt, as produced in solar pans containing 0.16-0.18% (w/w) $Ca^{2+}$, 0.3-0.4% (w/w) $Mg^{2+}$ and 0.70% (w/w) $SO_4^{2-}$, when subjected to rain washing contains 0.21% (w/w) $Ca^{2+}$, 0.06% (w/w) $Mg^{2+}$ and 0.60% (w/w) $SO_4^{2-}$. Although rain washing reduces Mg impurities to some extent, the Ca and $SO_4$ impurities cannot be reduced from the harvested salt even by repeated washings. On the contrary, it is observed that the concentration of Ca increases after rain-washing. Moreover, washing of salt either through rain washing or using method of counter/concurrent washing of salt with saturated brine is effective in removal of superficial impurities. The trace element impurities present in lattice of the salt crystals cannot be eliminated by simple washing.

H. M. Patel, in his research article that appeared in the *Proceedings of 6th International Symposium on Salt*, Vol. 2 pp. 515-533, has disclosed that Ca and $SO_4$ impurities in salt can be reduced using the difference in dissolution rate of NaCl and $CaSO_4$. The main drawbacks of the process are that it employs unit operations like dissolver and chemical process reactor. It also requires addition of lime and soda for the removal of Mg and Ca and subsequent filtration of brine.

In the article "*Washing of Strip Mined Rock and Solar Salt at Leslie Salt Corporation US*" (*Symposium on Salt-I, Vol. 1*, the Northern Ohio Geological society Incorporation, Cleveland (1961), p 449-464), A Woodhill has reported that Ca, Mg and $SO_4$ impurities in solar salt can be reduced by mechanical washing. The main disadvantage of the method is that there is a 15-20% loss of salt and the method requires high capital investment. Moreover, the maximum level of reduction of Ca is 70% and embedded impurities are difficult to remove.

Reference may be made to the research article: "*Upgrading Solar Salt by Mechanical Washing*" by M. P. Bhatt et al. appeared in the *Proceedings of 7th International Symposium on Salt*, Vol. 2 pp. 517-525, wherein it is reported that salt loss in bench scale washing of freshly harvested sea produced at Bhavnagar; freshly harvested salt produced from well brine at Kharaghoda and freshly harvested salt produced from stored well brine at Andhra Pradesh in mechanical washery were found from 15-21%.

Reference may be made to the article "*Manufacture of Solar Salt by Series Feeding System*" (Salt Research and Industry, 11, 1979, p 9) R. B. Bhatt et al. report that solar salt with reduced levels of Ca can be produced from sea water by a series feeding method wherein the salt is harvested in two stages i.e. between 25.5-27° Be' (Sp. Gr. 1.214-1.230) and 27-29° Be' (Sp. Gr. 1.230-1.250). Salt harvested in the first stage contains reduced levels of Mg and $SO_4$ impurities whereas the salt harvested in the second stage contains low Ca whereas the Mg and $SO_4$ impurities are comparatively higher. The drawback of this process is that calcium and sulphate impurities cannot be reduced beyond a certain point even though higher levels of reduction are desirable. The article does not describe the processing of sub-soil brines which is deficient in sulphate content as compared to sea brine. More over there is no mention about the eradication of trace element impurities from salt.

Reference may be made to the Indian Patent No. 191912 entitled "Preparation of Sodium Chloride Containing Low $Ca^{2+}$ Impurity from Sea Brine in Solar Salt Works" by CSIR claimed that addition of a polysaccharides such as starch in a concentration of 50-150 ppm into concentrated brine can reduce calcium impurity in salt to less than 0.05-0.1 percent. The drawbacks of the process are that it requires addition of hot solution of starch which is both cumbersome and costly and addition has to be repeated several times. The process aims mainly on the reduction of $Ca^{2+}$ and no mention is made of the effect of the treatment on other impurities in salt.

Reference may be made to WO 2004069371 dated 19 Aug., 2004 Kamishima Hiroshi et al. have claimed that sodium chloride crystals with reduced impurities can be produced from aqueous sodium chloride solutions by passing the solution through a column packed with an adsorbent on to which the impurity is selectively adsorbed. The drawbacks of the process are that it is not applicable to a multi-component system like sea/sub-soil brine. This process does not give any clue about the production of superior quality salt directly from sea/sub-soil brine in a solar salt works with reduced levels of trace elements detrimental for its industrial applications.

Reference may be made to U.S. Pat. No. 4,072,472 dated 7 Feb., 1978 on "Production of High purity salt from high sulphate salt deposits" by A. Lukes Jerome it is reported that subterranean salt deposit is solution mined, and the resulting calcium- and sulphate-contaminated brine is treated with soda ash to precipitate calcium compounds. After settling the slurry the clear brine is evaporated in a series of solar ponds to produce high-grade sodium chloride. This process is not economically feasible for large solar salt works where salt is produced from sea/sub-soil brines. Moreover, the process removes only calcium content from salt and other impurities are not eliminated.

Reference may be made to U.S. Pat. No. 3,647,396 dated 7 Mar., 1972 "Production of High Purity Salt", H. W. Dewittie et al. have claimed to have developed a process for the recrystallization of sodium chloride in the form of high purity cubic crystals from a sodium chloride source containing calcium sulphate impurity by multi-effect evaporation preceded by treatment of the hot sodium chloride saturated brine by flocculants and settling, to cause the undissolved calcium sulphate particles and other suspended solids to agglomerate and settle out of the brine prior to recrystallization of sodium chloride eliminating the conventional requirement for filtering the hot brine. The main drawbacks of the process are that it involves recrystallization adopting hot extraction method which is expensive, time consuming and energy intensive. There is no mention of the utility of the said method for production of pure salt directly in solar salt works.

Reference may be made to Central Salt a Marine Chemicals Research Institute's Biennial reports 2000-2002 and 2002-2004 appearing in the Institute's website (www.csmcri.org) wherein the purification of saturated brine using ion selective resins and a nanofiltration process for the reduction of Ca and $SO_4$ from sea water is reported. Both the processes have not addressed the methodologies for the elimination of trace elements from salt.

Reference may be made to U.S. Pat. No. 6,776,972 dated 17 Aug., 2004, "Recovery of Common Salt and Marine Chemicals from Brine" by CSIR has reported a process for the recovery of high purity solar salt from subsoil/sea brines employing the brine desulphatation process. The process is further integrated with the recovery of marine chemicals like potash and magnesia. The process reduces Ca and Mg impurities from salt as specified by chlor-alkali industries but the patent is silent about the removal of trace element impurities from salt.

Reference may be made to EP 1928569 B1 dated 16 Mar., 2011, "A cost-effective process for the preparation of solar salt having high purity and whiteness" by CSIR have claimed to have developed a cost effective process for the production of high purity solar salt (>99.5% purity on dry basis after heap washing) with improved whiteness and having highly reduced levels of calcium and sulphate impurities and also of heavy metal ions. Although the process as developed has many advantages in terms of ease of operation and eliminating the calcium and sulphate impurities to the minimum possible levels, magnesium impurities are not reduced in the same proportion as a result of which the Ca to Mg ratio in the salt is <1 and, consequently, fails to meet the preferred ratio of 2-4 desired in chlor-alkali industries. In addition, the elimination of trace element impurities especially bromide has not been addressed in this patent.

Reference may be made to U.S. Pat. No. 8,021,442 dated 20 Sep., 2011 entitled "An improved process of preparation of common salt of high purity from brines in solar salt pans", by CSIR have reported a process for the production of high purity solar salt with desired ratio of Ca to Mg suitable for chlor-alkali manufacture. This patent is also silent about the alleviation of bromide impurities, which is a specific requirement of certain specialty chemical industries.

Reference may be made to the article "*Design and Layout of Solar Salt Works*" by B. S. Joshi et al. (Sixth International Symposium on Salt, 1983-Vol. II, Table 5, p 284) wherein it is reported that success of an ideal salt works depends mainly on the optimum design and layout. Maximum yield and higher purity of salt can be achieved by proper-layout. Based on the gross yearly and seasonal evaporation rate, percolation losses, initial density of brine or seawater, number of available days, evaporation rate of different density brines and expected production, empirical relationships between these parameters are worked out. These computations form a guideline whenever a new salt works is to be laid out or improvement is sought in an existing salt works. To derive an empirical formula to calculate the area, the following factual data of the Bhavnagar Salt Works is considered for a model salt works with a production capacity of 5000 TPA.

| Compartment | Density Range | Area (m$^2$) |
|---|---|---|
| Crystallizer | 25-29° Be' | 38510 |
| Condensers | 23-25° Be' | 4665 |
|  | 17-23° Be' | 19445 |
|  | 14-17° Be' | 14892 |
|  | 10-14° Be' | 32112 |
|  | 6-10° Be' | 70930 |
| Reservoirs | 3.5-6° Be' | 121395 |
|  | 3-3.5° Be' | 47664 |
|  | 2.5-3° Be' | 66303 |
|  | 2-2.5° Be' | 98858 |
| TOTAL |  | 514774 |

This paper also describes that as the brine is lost continuously due to percolation, makeup brine must be provided to achieve the targeted production of 5000 TPA. To feed the required quantity of saturated brine to the crystallizers, an additional quantity of brine equivalent to percolated (lost) brine has to be made up in order to maintain production.

It is evident from the prior art that there are certain drawbacks in all the processes, especially as applicable to solar salt production with reduced levels of trace elements in the field. There are many processes where a salt of high purity is obtained but the processes are either cumbersome or costly and not practical for implementation in the field. On the other hand, the process of recrystallization to produce high purity salt as reported in the recent prior art is an attractive process for production of high purity solar salt in the field, with reduced levels of Ca, Mg, $SO_4$ and trace elements for its specialty industrial applications.

OBJECTS OF THE INVENTION

The main object of the present invention is to provide an improved process of preparation of common salt of high purity from brines in solar salt pans which obviates the drawbacks of the reported processes as detailed above.

Another object of the present invention is to produce common salt having purity >99.5% NaCl on dry weight basis and all impurities including trace elements as per specialty chemical industries requirement which demands bromide content in salt below 10 ppm.

Still another object of the present invention is to produce high purity salt with desired minimum level of trace elements directly in the field without the use of any salt upgrading equipments hitherto not achieved.

Yet another object of the present invention is to show that high purity salt can be produced directly in the field during solar salt production process without using any additional implements.

Yet another object of the present invention is to show that sea water which is the chief raw material for salt production can be used for upgradation of salt with great ease as a part of salt production process.

Yet another object of the present invention is to show that there is no loss of salt during the process of upgradation.

Yet another object of the present invention is to show that the saturated brine after harvesting of high purity salt can be mixed with additional seawater and salt for a second crop of recrystallized salt with no significant detrimental effect.

Yet another object is to feed back the saturated brine after harvesting of the second crop to the pre-crystallizer.

Yet another object of the present invention is to show that the end liquor arising from the process at the end of the salt season can be mixed with bittern and processed further for the recovery of valuable marine chemicals.

Yet another object of the present invention is to show that the process is totally environmentally friendly.

Yet another object of the present invention is to show that the process adopted for the upgradation of salt is not energy intensive.

Yet another object of the present invention is to show that the existing salt pans can be utilized for the production of high purity solar salt.

Yet another object of the present invention is to show that the method of producing high purity solar salt is viable on a commercial scale.

Yet another object of the present invention is to show that the method is ideally suitable for producing high purity salt for demanding specifications desired by end user applications, and which cannot be achieved through other means of purification such as rainwater washing and mechanical washing.

Yet another object of the present invention is to show that the additional area required for the recrystallization process is 8-9% for solar sea salt starting with seawater of 3° Be'.

Yet another object is to show that the yield of recrystallized salt is similar to that of mechanically washed salt.

Yet another object is the preparation of a superior quality of salt with minimum capital investment and energy cost.

SUMMARY OF THE INVENTION

Figure 1:
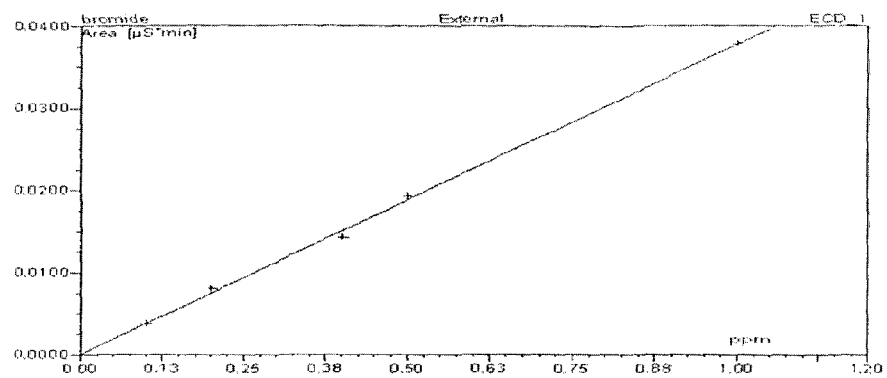
FIG. 1 is the IC (ion chromatography) calibration plot for bromide having the concentration range 0.10, 0.20, 0.40, 0.50 and 1.00 ppm in 1% pure NaCl which is equivalent to 10, 20, 40, 50 and 100 ppm in original salt.
Figure 2:
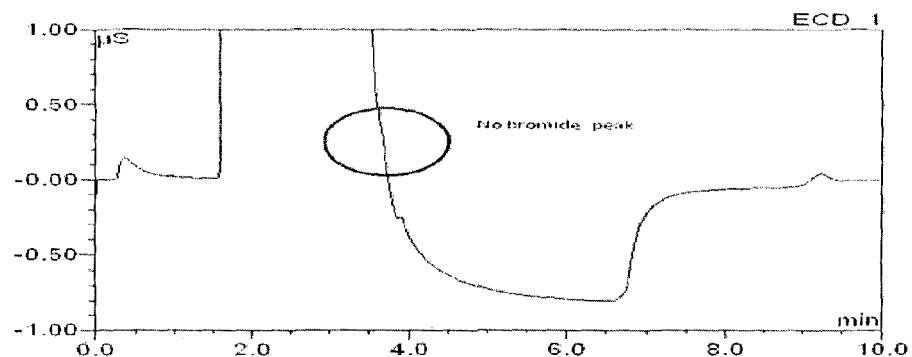
FIG. 2 is the IC chromatogram of 1% pure NaCl solution where no bromide peak is visible.
Figure 3:
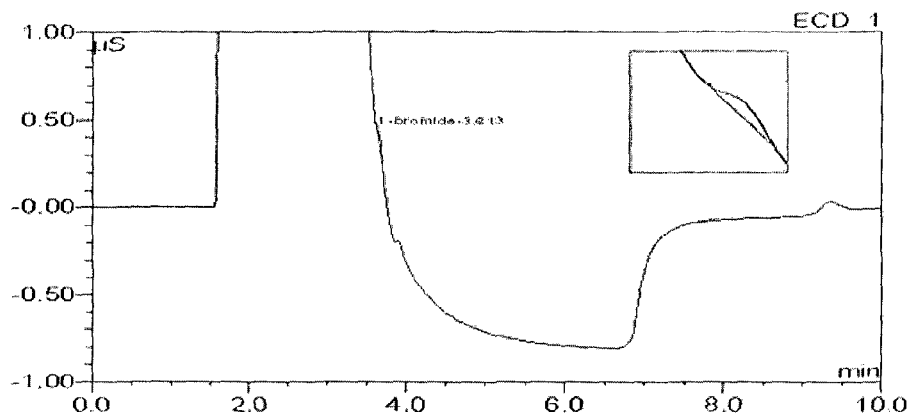
FIG. 3 shows the IC chromatogram of lower limit of quantification for bromide, 10 ppm in salt. In inset, the bromide peak is represented in the expanded form.
Figure 4:
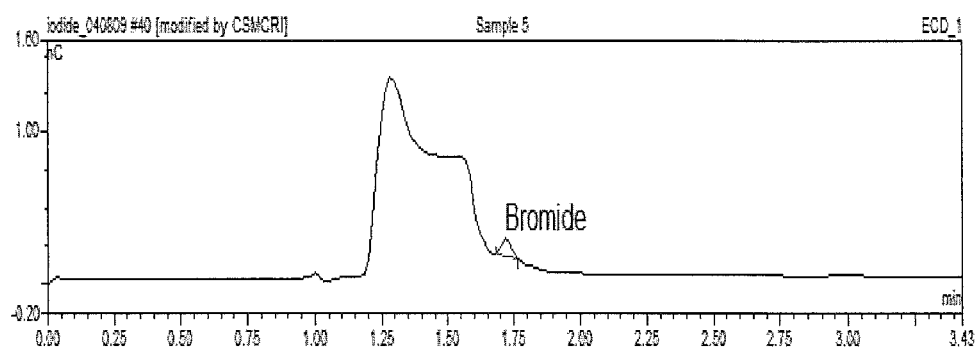
FIG. 4 shows the IC chromatogram of salt produced through earlier patented process wherein peak is indicative of impurities of bromide, 77 ppm.
Figure 5:
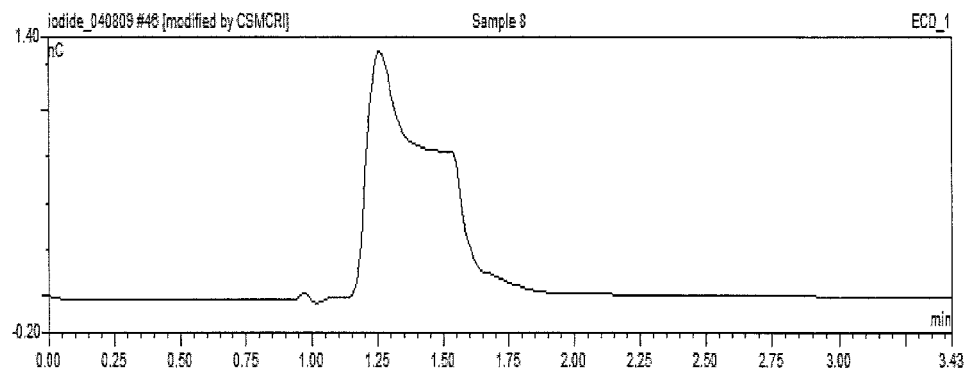
FIG. 5 is the IC chromatogram of salt produced through the present invention wherein bromide peak is not visible indicating that the bromide content in salt is below quantification level, <10 ppm.

Accordingly, present invention provides a process for production of high purity salt, also known as recrystallized salt with reduced level of impurities by solar recrystallization of solar sea salt using seawater medium and the said process comprising the steps of:

i. adding the salt prepared by known method into seawater upto saturation level to obtain saturated brine;

ii. spreading the saturated brine as obtained in step (i) in a pre-crystallizer to effect solar evaporation till 27° Be' saturated brine;

iii. draining out the saturated brine of 27° Be' as obtained in step (ii) into a second crystallizer;

iv. heaping and washing the salt with water to obtain high purity salt;

v. adding seawater into the pan to restore the original volume and thereafter adding more salt up to saturation point;

vi. repeating the process of evaporation in (b) above vii. once again harvesting more salt;

viii. discharging the saturated brine of 27° Be' this time into the pre-crystallizer.

In an embodiment of the present invention, the salt used in step (i) is >99.0-99.2% (w/w) purity (dry basis) and contain 0.08-0.12% (w/w) $Ca^{2+}$, 0.03-0.10% (w/w) $Mg^{2+}$, 0.2-0.5% (w/w) $SO_4^{2-}$, and 50-150 ppm $Br^-$, traces of iodine and heavy metal impurities.

In another embodiment of the present invention, the seawater used for recrystallization had a density in the range of 2.5-5.5° Be' and which is clarified to have low turbidity by known means.

In yet another embodiment of the present invention, said high purity salt meet stringent specifications, and particularly to achieve such specifications by dislodging impurities that reside in the lattice of the salt crystal. The process as claimed in claim 1, wherein the recrystallized salt as obtained in step (iv) had an absolute purity in the range of 99.4-99.8% on dry basis with the impurity levels of $Ca^{2+}$, $Mg^{2+}$, $SO_4^{2-}$ and $Br^-$ being 0.02-0.0.3% (w/w), 0.01-0.02% (w/w), 0.07-0.1% (w/w) and <10 ppm (w/w), respectively, and the iodine level and heavy metal impurities were also greatly reduced.

In yet another embodiment of the present invention, the yield of high purity salt is in the range of 75-80%.

In yet another embodiment of the present invention, the additional requirement of area for recrystallization is 8-9% when the seawater taken for salt preparation has an initial density of 3.0° Be'.

In yet another embodiment of the present invention, said process utilizes only solar energy for recrystallization and is consequently both cost-effective and eco-friendly.

In yet another embodiment of the present invention, said process minimizes downstream costs of purification by end user industries and also enables products complying with desired specifications to be more readily met.

In an embodiment of the present invention the brine used in the process is natural brine like sea water.

In another embodiment of the present invention the concentrated brine after the process of step (a) has a density of 25° Be'.

In yet another embodiment of the present invention the flocculating agent like alum is prepared as an 8-12% (w/v) solution in dilute brine.

In yet another embodiment of the present invention the flocculating agent is added up to a concentration in the range of 25-75 ppm.

In yet another embodiment of the present invention the turbidity of the brine after clarification is reduced to 1.5-2.5 NTU.

In yet another embodiment of the present invention the salt crystallized from the saturated brine is harvested and heap washed with 4-5% of fresh water to remove the adhering impurities.

In yet another embodiment of the present invention the heap washed salt is dried in the open sun.

In yet another embodiment of the present invention the moisture content of the sun dried salt is <1%.

In yet another embodiment of the present invention the saturated brine of 27° Be' is mixed with fresh sea water and processed for the production of high purity salt.

In yet another embodiment of the present invention the salt produced is of very high quality with reduced levels of impurities.

In yet another embodiment of the present invention the Br content of salt is reduced to <10 ppm as required by specialty chemical industries.

In yet another embodiment of the present invention the saturated brine of 27° Be' contaminated with higher amounts of impurities is mixed with bittern generated in the solar salt works for its further processing for the recovery of marine chemicals.

In yet another embodiment of the present invention the entire process is carried out under ambient conditions.

In yet another embodiment of the present invention the process is cost effective and can be implemented in any solar salt works.

In yet another embodiment of the present invention the absolute purity of salt is in the range of 99.4-99.8% on dry basis and the impurity levels of $Ca^{2+}$=0.02-0.0.3% (w/w), $Mg^{2+}$=0.01-0.02% (w/w), $SO_4^{2-}$=0.07-0.1% (w/w), <10 ppm (w/w).

DETAILED DESCRIPTION OF THE INVENTION

The present invention relates to a novel, easy-to-apply and cost-effective method of production of high purity solar salt, also known as recrystallized salt, with a NaCl purity of >99.5% on dry weight basis and all other trace elements including Br below 10 ppm as required by some of the specialty chemical industries.

Solar salt having $Ca^{2+}$=0.09% (w/w), $Mg^{2+}$=0.05% (w/w), $SO_4^{2-}$=0.28% (w/w) and $Br^-$=77 ppm produced through the earlier patented processes was mixed with sea brine having an initial density of 3° Be' (Specific gravity 1.02). The brine was saturated with NaCl by dissolving the above salt till the brine attained 25° Be' density (Specific gravity 1.21). NaCl concentration in the saturated brine was measured as 30% NaCl (w/v) which was treated with flocculating agents like alum at a concentration of 30-35 ppm to remove the floating impurities like clay. The saturated brine was transferred to a solar pan and evaporated upto 27° Be' (Specific gravity 1.23). The crystallized salt in the pans was collected, heaped and washed with 5% sweet water. The discharged bittern was recycled back to the pre crystallizer and mixed with the concentrated sea brine to extract the unrecovered salt present in bittern after crystallization of salt. The washings were diverted to the salt crystallization ponds where the normal solar salt production is in progress. As a result salt having absolute purity and the trace elements well within the prescribed limits is produced.

Present invention provides a process for preparing in the field an improved quality industrial grade solar salt from seawater, the said salt having a purity of >99.5% NaCl on dry weight basis, $Ca^{2+}$=0.02-0.03% (w/w), $Mg^{2+}$=0.01-0.02% (w/w), $SO_4^{2-}$=0.07-0.1% (w/w) and $Br^-$<10 ppm, and exceedingly low levels of heavy metals as required by the specialty chemical industries comprising the steps of:
  i. subjecting sea brine to mix with solar salt to obtain saturated brine of 25° Be' density;
  ii. feeding the brine of (a) into a pre-crystallizer pond and dosing optimized amounts of flocculating agents like alum into the brine;
  iii. settling of the suspended particles of clay under gravity with concomitant clarification of brine (NTU<2);
  iv. feeding the above said clarified brine into a crystallizer pond by gradient flow through brine channels;
  v. continuing solar evaporation of the saturated brine to crystallize out salt till 27° Be' density;
  vi. draining out the saturated brine of 27° Be' from the crystallizer ponds as per normal process;
  vii. harvesting, washing and drying the salt in the open sun to obtain high purity salt of desired specifications;
  viii. mixing saturated brine of 27° Be' with fresh sea water and dissolving salt to obtain saturated brine;
  ix. repeating steps from (b) to (h) to produce high purity salt in a continuous fashion;
  x. Putting the saturated brine after recovery of the second crop of salt into the pre-crystallizer.

Throughout the specification, the density of brine is defined in terms of ° Be' which is a convenient and widely used scale for measuring brine density in solar salt works. It gives a direct measure of the quantity of salt dissolved in 100 g of solution. In American systems, degree Baume is related to the specific gravity by the equation:

$$\text{Specific gravity} = 145/(145 - °\text{ Be'})$$

In chemistry, recrystallization is a procedure for purifying compounds. The most typical situation is that a desired "compound A" is contaminated by a small amount of "impurity B". There are various methods of purification, recrystallization being one of the methodologies.

Typically, the mixture of "compound A" and "impurity B" are dissolved in the smallest amount of solvent to fully dissolve the mixture, thus making a saturated solution. The solution is then allowed to evaporate to remove the solvent concomitantly separating the "compound A" in its pure form. The concentration of the solution is adjusted in such a way that it removes maximum impurities from "compound A". The solvent saturated with impurities and "compound A" is mixed with the fresh solvent so that the solvent gets unsaturated with impurities as well as "compound A" facilitating further dissolution of the compound along with the impurities. There are various methods of removing the solvent for crystallizing the desired compound, but the most practical method in purification of salt in solar salt works is the removal of solvent, here water, through solar evaporation. The criticality of any process of recrystallization is identifying the correct point at which the evaporation can be stopped and the solvent saturated with maximum amount of impurities can be discharged from the recrystallization ponds. After optimizing the parameters as above field experiments were conducted for the production of high purity solar salt.

Solar salt having $Ca^{2+}$=0.09% (w/w), $Mg^{2+}$=0.05% (w/w), $SO_4^{2-}$=0.28% (w/w) and $Br^-$=77 ppm was produced as per the methodology described in the prior-art. The salt so produced was mixed with fresh sea brine having an initial density of 3° Be'. The brine was saturated with NaCl by dissolving the salt till the brine attained 25° Be' density. NaCl concentration in the saturated brine was measured as 30% NaCl (w/v).

The saturated brine (25° Be') so obtained was transferred to pre-crystallizer ponds and treated with flocculating agents like alum at a concentration of 25-75 ppm and was allowed to settle for 48 hrs. The clarified brine having an NTU<2.5 was transferred to a crystallizer pond.

The saturated brine of 25° Be' density was allowed to evaporate upto 27° Be' and crystallized salt was harvested, heaped and washed with fresh water. The washed salt was subjected to solar drying.

The wash liquor was mixed with process brine in the pre-crystallizer for the normal solar salt production.

The saturated brine of 27° Be' density was mixed with fresh sea water and processed further for the production of high purity salt.

The saturated brine contaminated with impurities of Ca, Mg, $SO_4$ and Br was mixed with normal bittern generated during the salt production activities and processed for the recovery of valuable marine chemicals as per known methodology.

The main inventive steps are:
(i) Being confronted with the challenge of reducing the bromide level in solar salt, the invention arose while seeking the desired objective in cost-effective manner.
(ii) Recognising that if impurities are trapped within the salt lattice there is little that conventional methods of refining salt such as mechanical washing fail to deliver the desired result in terms of the purity sought.
(iii) Recognizing that while alum-clarified and pH adjusted brine yields salt with high absolute purity even without mechanical washing, bromide content cannot be brought down to the desired level demanded by certain specialty chemical industries.
(iv) Consequently, seeking a cost-effective and unconventional solution, and thereafter conceiving the idea of solar recrystallization of salt in salt pans.
(v) Recognising that many salt works have spare land which can be deployed for this purpose.
(vi) Recognising that the process of re-crystallization would be especially attractive if seawater can be utilized in the recrystallization process.
(vii) Thereafter demonstrating that recrystallization with seawater indeed enables the desired result to be obtained.
(viii) Recognising that the process can be implemented in any solar sea salt works irrespective of its size.
(ix) Recognising that the invention does not involve the use of any conventional energy source making the process cost effective and also environmentally friendly.

EXAMPLES

Following examples are given by way of illustration and therefore should not be construed to limit the scope of the present invention.

Example 1

Solar salt of high purity was prepared following the procedure outlined in U.S. Pat. No. 8,021,442. The salt exhibited >99% purity (on dry basis) and had the following analysis of impurities: $Ca^{2+}$=0.09% (w/w), $Mg^{2+}$=0.05% (w/w), $SO_4^{2-}$=0.28% (w/w) and $Br^-$=77 ppm (by ion chromatography). Notwithstanding the high purity of the salt, it is always desirable to reduce impurity levels to the maximum extent possible to reduce downstream purification costs. Moreover, in the case of the bromide impurity, it is considered to be high for chloroform synthesis, where maximum 10 ppm bromide level in salt is tolerable to maintain the chloro bromo methane impurity level within the desired limit.

The estimation of $Ca^{2+}$, $Mg^{2+}$ and $SO_4^{2-}$ was carried out using the classical methods of chemical analysis. $Ca^{2+}$ and $Mg^{2+}$ were estimated through complexometric titrations using EDTA. $SO_4^{2-}$ was estimated using the gravimetric method employing barium chloride solution.

Bromide was estimated using Ion Chromatographic (IC) method with conductivity detection using the following parameters:

Eluent=20 mM of 50% NaOH of Sigma Company, Column=AS 11, Flow rate=1 ml per minute, Injection loop=10 µl, Current=50 mA, Suppressor=ASRS300.

The trace element impurities in salt were estimated using Inductively Coupled Plasma (ICP) instrument.

Example 2

The salt of Example 1 was dissolved in 0.1 cum of sea water having density of 3° Be' (Specific gravity 1.02) and the saturated brine was found to contain 30% (w/v) NaCl. It was solar evaporated in an open HDPE tray keeping a depth of 30 cm. The brine was evaporated till it attained a density of 27° Be' (Specific gravity 1.23). The re-crystallized was heaped in the tray and kept for 48 hrs to allow the mother liquor (bittern) to drain off. It was washed with only 1 titer of saturated brine. The washed salt weighed 20.5 kg and analyzed as $Ca^{2+}$=0.02%(w/w), $Mg^{2+}$=0.015%(w/w), $SO_4^{2-}$=0.05% (w/w) and Br<10 ppm (note 10 ppm was the lower limit of quantification for the ion chromatographic method employed and hence the absolute value was difficult to provide below 10 ppm).

| Trace metal analysis of Upgraded Salt | |
|---|---|
| Constituents | mg/kg (ppm) |
| Al | <0.0280 |
| Br | <10 |
| Cd | <0.0130 |
| Co | <0.0070 |
| Cr | <0.0071 |
| Fe | 0.1520 |
| Pb | <0.0420 |
| Ni | <0.0150 |
| Zn | <0.0059 |

Example 3

The experiment was repeated by dissolving 116 MT of solar salt having the composition as given in The same sea water used in Example 2 was taken in a 61 m×38 m pre-crystallizer pan up to a depth of −17.5 cm and its volume was estimated to be 412 cum. 116 MT of the salt of Example 1 was thereafter added to obtain 30% (w/v) concentration of NaCl. The saturated brine was thereafter treated with non-ferric alum at a concentration of 30-35 ppm and allowed to stand for 48 hours to facilitate the settling of suspended impurities as disclosed in EP 1928569 B1. The clear brine having an NTU<2.5 was then transferred to a crystallizer of similar dimension as above and subjected to solar evaporation up to 27° B' (Specific gravity 1.23). 70 MT of re-crystallized salt having the impurity levels: $Ca^{2+}=0.02\%$ (w/w), $Mg^{2+}=0.02\%$ (w/w), $SO_4^{2-}=0.06\%$ (w/w) and $Br^-<10$ ppm was harvested and heap washed with 3.5 cum of fresh water which, in turn, gave $Ca^{2+}=0.02\%$ (w/w), $Mg^{2+}=0.015\%$ (w/w), $SO_4^{2-}=0.05\%$ (w/w) and $Br^-<10$ ppm. The volume of the mother liquor, together with the washings, was 177 cum. It was recycled in the subsequent batch as shown in the Example 4 below.

Example 4

170 cum of the mother liquor bittern of Example 3 was mixed with 240 cum of fresh seawater and 75 MT of the solar salt of Example 1 was dissolved to obtain saturated brine having 30.3% (w/v) NaCl. The process of Example 3 was repeated and 85 MT of re-crystallized salt having the composition $Ca^{2+}=0.03\%$ (w/w), $Mg^{2+}=0.02\%$ (w/w), $SO_4^{2-}=0.06\%$(w/w) and $Br^-<10$ ppm was harvested and heap washed with 5 cum of fresh water to give a final analysis of $Ca^{2+}=0.02\%$ (w/w), $Mg^{2+}=0.015\%$ (w/w), $SO_4^{2-}=0.05\%$ (w/w) and $Br^-<10$ ppm. The volume of mother liquor brine was 170 cum. This example teaches the value of recycle of the mother liquor brine to maximise salt recovery from the overall amount of salt taken for recrystallization, without compromising on quality.

Examples 3 and 4 together teach us that it is feasible to obtain a yield of ca. 80% of solar recrystallized salt having high purity.

Example 5

105 MT of solar salt having the composition as given in Example 1 was dissolved in 380 cum of sea brine [$Ca^{2+}=0.07\%$ (w/v), $Mg^{2+}=0.18\%$ (w/v), $SO_4^{2-}=0.49\%$ (w/v), NaCl=4.2% (w/v)] having an initial density of 5.3° Be' (Specific Gravity 1.038) and having the composition as The brine was saturated with NaCl by dissolving the salt till the brine attained 25° Be' density (Specific Gravity 1.208). The volume of saturated brine was measured as 410 cum. This saturated brine of 25° Be' density was clarified in the precrystallizer pond as mentioned in Example 2 & 3. The clarified brine having an NTU<2.5 was transferred to crystallizer pond of size 61 meter×38 meter. The depth of the brine in the crystallizer was measured as 17.5 cm. The brine was concentrated using solar energy till it attained 27° Be'. The volume of brine at this stage was reduced to 164 cum. The brine at this stage was discharged and recycled in the next batch. 80 MT of re-crystallized salt having the composition as $Ca^{2+}=0.03\%$ (w/w), $Mg^{2+}=0.02\%$(w/w), $SO_4^{2-}=0.07\%$ (w/w) and $Br^-<10$ ppm was harvested and heap washed with 4 cum of fresh water. The heap washed salt analyzed $Ca^{2+}=0.02\%$(w/w), $Mg^{2+}=0.015\%$(w/w), $SO_4^{2-}=0.05\%$ (w/w) and $Br^-<10$ ppm. All other trace elements detrimental for industrial use were found to be within the prescribed limits. The saturated brine of 27° Be' (Specific gravity 1.23) left after the harvesting of salt was discharged from the crystallizer and recycled. The yield of the single crop worked out to 76%.

Example 6

Based on results obtained in example 3&4 for two crops of recrystallized salt and in Example 5 for one crop of recrystallized salt the yields as mentioned were 79% and 76%, respectively. The additional area required for such recrystallization based on data in the prior art comes to 8.8% for salt production from seawater having 3° Be'.

ADVANTAGES OF THE INVENTION

1. Solar sea salt as obtained through various processes disclosed in the prior art can be upgraded cost-effectively through the process of the invention to improve the quality, specifically with regards to impurities such as bromide which appear to be trapped within the crystal lattice and are difficult to dislodge through refining techniques such as mechanical washing, rain water washing, etc.
2. The process does not require major investments.
3. It helps salt works having spare land to make better use of their assets.
4. The process requires no energy input other than solar energy and is thus cost effective and environmentally friendly.
5. By minimising the impurities in salt, reduced waste is generated by industries downstream.
6. Similarly, by minimising trace impurities such as bromide, heavy metals, etc., products can be made which conform to stricter specifications.
7. The process is not capital intensive.
8. The process utilizes only solar energy for recrystallization and is consequently both cost-effective and eco-friendly.
9. The process is readily scalable.
10. The process minimizes downstream costs of purification by end user industries and also enables products complying with desired specifications to be more readily met.

The invention claimed is:

1. A process for production of high purity salt with reduced level of impurities by solar recrystallization of solar sea salt using seawater medium, said process comprising the steps of:
   i. adding the salt prepared by known method into seawater upto saturation level to obtain saturated brine;
   ii. spreading the saturated brine as obtained in step (i) in a pre-crystallizer to effect solar evaporation till 27° Be' saturated brine;
   iii. draining out the saturated brine of 27° Be' as obtained in step (ii) into a second crystallizer;
   iv. heaping and washing the salt with water to obtain high purity salt;
   v. adding seawater into the pan to restore the original volume and thereafter adding more salt up to saturation point;
   vi. repeating the process of evaporation in (ii) above;
   vii. once again harvesting more salt;
   viii. discharging the saturated brine of 27° Be' into the pre-crystallizer.

2. The process as claimed in claim 1, wherein the salt used in step (i) is >99.0-99.2% (w/w) purity (dry basis) and contains 0.08-0.12% (w/w) $Ca^{2+}$, 0.03-0.10% (w/w) $Mg^{2+}$, 0.2-0.5% (w/w) $SO_4^{2-}$, and 50-150 ppm $Br^-$, traces of iodine and heavy metal impurities.

3. The process as claimed in claim 1, wherein the seawater used for recrystallization has a density in the range of 2.5-5.5° Be' and is clarified to have low turbidity by known means.

4. The process as claimed in claim 1, wherein the high purity salt as obtained in step (iv) has an absolute purity in the range of 99.4-99.8% on dry basis with the impurity levels of $Ca^{2+}$, $Mg^{2+}$, $SO_4^{2-}$ and $Br^-$ being 0.02-0.0.3% (w/w), 0.01-0.02% (w/w), 0.07-0.1% (w/w) and <10 ppm (w/w), respectively, and the iodine level and heavy metal impurities are also greatly reduced.

5. The process as claimed in claim 1, wherein the yield of high purity salt is in the range of 75-80%.

6. The process as claimed in claim 1, wherein the additional requirement of area for recrystallization is 8-9% when the seawater taken for salt preparation has an initial density of 3.0° Be'.

7. The process as claimed in claim 1, wherein said process utilizes only solar energy for recrystallization and is consequently both cost-effective and eco-friendly.

8. The process as claimed in claim 1, wherein said process minimizes downstream costs of purification by end user industries and also enables products complying with desired specifications to be more readily met.

9. The process as claimed in claim 1, wherein said high purity salt meets stringent specifications, and particularly to achieve such specifications by dislodging impurities that reside in the lattice of the salt crystal.

\* \* \* \* \*